UNITED STATES PATENT OFFICE 2,396,509

ACIDPROOF CEMENTS

Emanuel A. Hertzell and Richard H. Anderson, Dover, Ohio, assignors to The Robinson Clay Product Company, Akron, Ohio, a corporation of Maine No Drawing. Application November 12, 1943, Serial No. 510,064

7 Claims. (Cl. 106—84)

This invention relates to acid-proof cementing compositions, and more especially it relates to the preparation of self-hardening acid-proof cements of the type employing sodium or potassium silicate.

It is customary in the preparation of cements of the character mentioned, to admix with the sodium or potassium silicate, among other ingredients, a composition capable of reacting with the caustic soda solution of the silicate to effect the setting or hardening of the cement, independently of any access to the atmosphere, and to render the same resistant to the action of water and acids. Compositions commonly used for this purpose are the alkali silico-fluorides, either sodium silico-fluoride or potassium silico-fluoride, and while such cements are satisfactory for some purposes, they are not entirely satisfactory for all purposes, especially in situations where extremely rapid setting at moderate temperatures is desired.

An important object of the invention is to provide an improved acid-proof cement of the type employing sodium or potassium silicate. More specifically the invention aims to provide an acid-proof cement that will set or harden more rapidly at moderate temperatures than cements of the character mentioned heretofore provided; and to provide a cement of the character mentioned wherein the composition that reacts with the sodium or potassium silicate is more potent than compositions heretofore provided for the same purpose, so that a smaller quantity of such composition will suffice. Other objects will be manifest as the description proceeds.

One of the features of the invention is the use, in a cement of the character mentioned, of alkali titanium fluoride. The latter, it is believed, reacts with the silicate and converts the silicic acid therein to solid form. Specifically, either sodium titanium fluoride, or potassium titanium fluoride may be used for the purpose. The silicate may consist either of sodium silicate or potassium silicate, which may be employed either in liquid form known as water glass solution, or in dry form. Only a relatively small amount of the alkali titanium fluoride is required to produce a satisfactory cement.

In addition to the sodium or potassium silicate and the alkali titanium fluoride, the cement includes one or more filling agents that are resistant to the action of water and acids. Such fillers comprise clays, pulverized clay products, and other similar suitable materials. The grain size of the filling agents is dependent upon the particular use to which the cement is to be put.

The following examples are illustrative of the invention, but it will be understood that the invention is not limited thereto:

(1) 200 grams of pulverized clay grog; 3 grams $K_2TiF_6$; and 90 grams of sodium silicate solution in which the proportion of $Na_2O$ to $SiO_2$ is 1:3.22 (40° Bé.). The mix hardens in about 5 minutes at 75° F.

(2) 200 grams of pulverized quartz sand; 3 grams $Na_2TiF_6$; and 90 grams of sodium silicate solution in which the proportion of $Na_2O$ to $SiO_2$ is 1:3.22 (40° Bé.). This mix hardens in about 5 minutes at 75° F.

(3) 100 grams of —20+48 mesh vitrified clay grog; 100 grams —65 mesh vitrified clay grog; 100 grams $K_2TiF_6$; 20 grams plastic clay; 40 grams dry powdered sodium silicate in which the proportion of $Na_2O$ to $SiO_2$ is 1:2; and water, 22% of the dry mix. This mix hardens in about 15 minutes at 75° F.

(4) 200 grams pulverized quartz sand; 3 grams of $Na_2TiF_6$; and 90 grams of potassium silicate solution in which the proportion of $K_2O$ to $SiO_2$ is 1:3.2. This mix hardens in about 40 minutes at 75° F.

From the foregoing it will be apparent that the composition of the invention hardens in a relatively short time due to the use of alkali titanium fluoride therein. The same compositions as Examples 1 and 2 employing alkali silicon fluoride instead of alkali titanium fluoride require from 15 to 20 minutes to harden at the same temperature. Furthermore, alkali titanium fluoride appears to be much more potent in its action than is alkali silicon fluoride in cements of this character. This is evidenced by the fact that a satisfactory mix may be made with only 0.5% sodium titanium fluoride whereas to obtain comparable properties 3% to 4% of sodium silicon fluoride is required. The advantages accruing from the small proportion of alkali titanium fluoride required, aside from the economy of material effected, lies in the fact that fluorides may be injurious to some chemicals that may come into contact with the cement, so that the smaller quantity employed the smaller is the possibility of contamination.

The precise proportions of the materials employed may be varied, and other materials having equivalent chemical properties may be employed if desired without departing from the spirit of the invention or the scope thereof as defined by the appended claims.

What is claimed is:

1. An acidproof cement comprising the reaction product of a small quantity of alkali titanium fluoride and an alkali silicate selected from the group consisting of sodium silicate and potassium silicate, and a filling agent resistant to the action of acids.

2. An acidproof cement comprising the reaction product of a small quantity of sodium titanium fluoride and an alkali silicate selected from the group consisting of sodium silicate and potassium silicate, and a filling agent resistant to the action of acids.

3. An acidproof cement comprising the reaction product of a small quantity of potassium titanium fluoride and an alkali silicate selected from the group consisting of sodium silicate and potassium silicate, and a filling agent resistant to the action of acids.

4. An acidproof cement comprising a mixture of 200 parts of a filling agent resistant to the action of acids, 3 parts of alkali titanium fluoride, and 90 parts of sodium silicate solution at 40° Bé.

5. An acidproof cement comprising a mixture of acid-resisting filling agents, dry powdered sodium silicate, a small quantity of potassium titanium fluoride, and water.

6. An acidproof cement comprising a mixture of an acid-resisting filling agent, potassium silicate solution, and a small quantity of sodium titanium fluoride.

7. An acidproof cement comprising a mixture of 200 parts vitrified clay grog, 10 parts potassium titanium fluoride, 20 parts plastic clay, 40 parts dry powdered sodium silicate, and water to the amount of 22% of the dry mix.

EMANUEL A. HERTZELL.
RICHARD H. ANDERSON.